United States Patent
Hoepfl et al.

[11] Patent Number: 5,964,009
[45] Date of Patent: Oct. 12, 1999

[54] TOOL WITH DUAL-MATERIAL HANDLE

[75] Inventors: Joseph R. Hoepfl, Greenfield; Christopher D. Thompson, Milwaukee, both of Wis.

[73] Assignee: Snap-on Technologies, Inc., Lincolnshire, Ill.

[21] Appl. No.: 08/931,086

[22] Filed: Sep. 15, 1997

[51] Int. Cl.⁶ .................................................. B25G 1/10
[52] U.S. Cl. ........................... 16/111 R; 16/DIG. 12; 81/177.1
[58] Field of Search ................... 16/110 R, 111 R, 16/DIG. 12; 81/177.1

[56] References Cited

U.S. PATENT DOCUMENTS

| | | |
|---|---|---|
| Re. 20,165 | 5/1936 | Knapp . |
| D. 329,367 | 9/1992 | Landy . |
| 2,177,064 | 10/1939 | Harsted . |
| 2,205,769 | 6/1940 | Sweetland . |
| 2,871,899 | 2/1959 | Coyle et al. ............... 81/177.1 |
| 2,985,209 | 5/1961 | Novelo . |
| 3,189,069 | 6/1965 | Stowell ..................... 81/177.1 |
| 3,302,673 | 2/1967 | Forsberg ................. 16/DIG. 12 |
| 4,381,579 | 5/1983 | Rumpp ..................... 16/111 R |
| 4,729,271 | 3/1988 | Kenigson ................... 81/177.1 |
| 4,837,892 | 6/1989 | Lo .......................... 16/111 R |
| 4,941,232 | 7/1990 | Decker et al. .............. 16/111 R |
| 4,951,533 | 8/1990 | Hillinger .................. 81/177.1 |
| 4,969,231 | 11/1990 | Mader et al. ............... 81/177.1 |
| 5,136,900 | 8/1992 | Chapin . |
| 5,355,552 | 10/1994 | Huang ...................... 16/111 R |
| 5,390,572 | 2/1995 | Gakhar et al. .............. 16/111 R |
| 5,446,941 | 9/1995 | Kelsay ..................... 15/143.1 |
| 5,551,323 | 9/1996 | Beere et al. ............... 16/111 R |
| 5,615,445 | 4/1997 | Kelsay et al. .............. 81/177.1 |

FOREIGN PATENT DOCUMENTS

| | | | |
|---|---|---|---|
| 0727289 | 8/1996 | European Pat. Off. ........ 16/111 R |
| 2611567 | 9/1988 | France ..................... 16/111 R |
| 2635998 | 3/1990 | France ..................... 81/177.1 |
| 9539200 | 4/1997 | Germany .................... 16/111 R |
| 9803967 | 4/1998 | Germany .................... 16/111 R |
| 2274615 | 3/1994 | United Kingdom ........... 16/DIG. 12 |

OTHER PUBLICATIONS

WO. 93/16846, Sep. 1993, Inventor: Holland–Letz 16/DIG. 12.

*Primary Examiner*—Chuck Y. Mah
*Assistant Examiner*—Donald M. Gurley
*Attorney, Agent, or Firm*—Emrich & Dithmar

[57] ABSTRACT

A driving tool, such as a screwdriver, has a handle with an injection-molded, relatively hard and rigid inner body, molded around a tool shank, the inner body having an elongated central portion with two end flanges extending laterally outwardly of the central portion around the entire periphery thereof, with the central portion having a peripheral groove formed therein adjacent to an end flange. An outer gripping body of a relatively soft and resilient material is injection molded around the inner body, surrounding said central portion of said inner body and filling said groove.

7 Claims, 1 Drawing Sheet

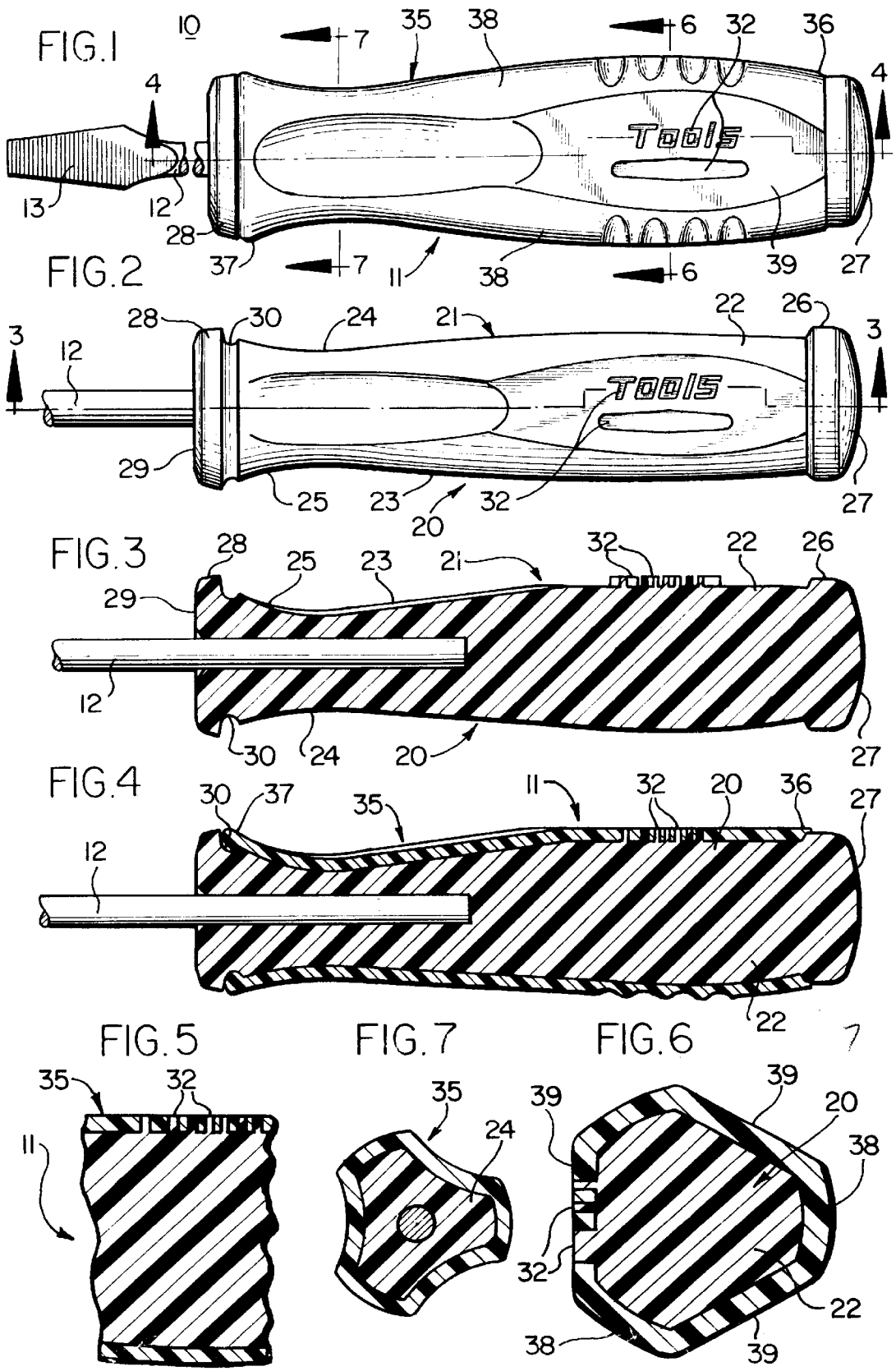

TOOL WITH DUAL-MATERIAL HANDLE

BACKGROUND OF THE INVENTION

1. Field of the Invention

The present invention relates to hand tools, particularly drivers, such as screwdrivers, nut drivers and the like. The invention has particular application to tool handles.

2. Description of the Prior Art

It is known to provide hand tools with plastic handles which are typically formed of a single plastic material molded around an end of a tool shank.

It is also known to provide tool handles with a two-part construction, including an inner portion formed of a hard or rigid material for the necessary handle strength, and an outer gripping portion formed of a softer and/or more resilient or flexible material for user comfort and to afford an improved grip by increasing the frictional gripping force between the tool handle and the user's hand. However, heretofore such dual-material handles have either had a relatively complex and expensive construction or have suffered from slippage of the outer hand grip portion relative to the inner body portion.

SUMMARY OF THE INVENTION

It is a general object of the present invention to provide an improved hand tool with a handle construction which avoids the disadvantages of prior tools while affording additional structural and operating advantages.

An important feature of the invention is the provision of a hand tool of the type set forth, with a dual-material handle of simple and economical construction.

In connection with the foregoing feature, a further feature of the invention is the provision of a handle of the type set forth, which affords improved user grip and comfort while providing superior bonding of the handle materials.

A further feature of the invention is the provision of a method of forming a handle of the type set forth.

Certain ones of these and other features of the invention are attained by providing a hand tool comprising: a relatively hard and rigid inner body having an elongated central portion and two end flanges extending laterally outwardly of the central portion around the entire periphery thereof, the central portion having peripheral grooves formed therein respectively adjacent to the end flanges, and an outer gripping body formed of a relatively soft and flexible material surrounding the central portion of the inner body and filling the grooves.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a side elevational view of a hand tool constructed in accordance with and embodying the features of the present invention, with a portion of the tool shank broken away;

FIG. 2 is a slightly enlarged, fragmentary, side elevational view of the tool of FIG. 1, with the outer gripping body removed;

FIG. 3 is a view in vertical section taken along the line 3—3 in FIG. 2;

FIG. 4 is a fragmentary view in vertical section taken along the line 4—4 in FIG. 1;

FIG. 5 is an enlarged, fragmentary, sectional view of a portion of the handle of FIG. 4;

FIG. 6 is an enlarged view in vertical section taken along the line 6—6 in FIG. 1; and FIG. 7 is an enlarged view in vertical section taken along the line 7—7 in FIG. 1.

DESCRIPTION OF THE PREFERRED EMBODIMENT

Referring to FIGS. 1 and 4–7, there is illustrated a hand tool, generally designated by the numeral 10, in the nature of a screwdriver. The tool 10 includes an elongated handle 11 and an elongated shank 12 projecting from one end of the handle 11, substantially axially thereof, and terminating in a tip 13, such as a flat blade screwdriver tip. While the tool 10 is in the form of a screwdriver, it will be appreciated that the principles of the present invention are applicable to other types of hand tools, particularly manually rotatable driver-type tools.

The handle 11 is of two-part construction, including an inner body 20 and an outer gripping body 35. Referring also to FIGS. 2 and 3, the inner body 20 is preferably injection molded around an end of the shank 12 and formed of a suitable plastic material, such as polypropylene, although other materials could be used. Preferably, the inner body 20, as molded, is a relatively hard and rigid member, including an elongated central portion 21 coaxial with the shank 12. The central portion 21 has a main rear section 22, a forwardly sloping section 23, a reduced cross-section neck section 24 and a flared section 25. The central portion 21 is unitary at its rear end with an end flange 26, which extends laterally outwardly from the central portion 21 around its entire periphery and has a curved end surface 27. The central portion 21 is unitary at its forward end with an end flange 28, which projects laterally outwardly from the central portion 21 around its entire periphery and terminates in a substantially flat end surface 29.

Formed in the outer surface of the inner body 20 at the junction between the central portion 21 and the front end flange 28 is a peripheral groove 30. If desired, a similar groove may be provided adjacent to the rear end flange 26. The inner body 20 has a transverse cross-sectional shape which varies from one end to the other. Thus, the main or rear section 22 has a transverse cross section which is generally in the shape of a triangle with rounded corners (see FIG. 6), while the cross section at the neck section 24 may have a generally tri-lobular shape (see FIG. 7). Raised indicia 32 may project laterally outwardly from the outer surface of the main rear section 22.

The outer gripping body 35 is preferably injection molded around the inner body 20 and is formed of a suitable thermoplastic elastomer material, although other materials could be used. Preferably, the material of the outer gripping body 35 is selected so that, in its as-molded condition, it is relatively soft and flexible to provide an improved gripping surface and improved comfort for a user's hand. The outer gripping body 35 completely covers the central portion 21 of the inner body 20 between the end flanges 26 and 28, except that the outer surface of the outer gripping body 35 is preferably substantially flush with the tops of the raised indicia 32, as can best be seen in FIGS. 4–6, filling all of the spaces between the indicia 32. The outer gripping body 35 also fills the groove 30 on the inner body 20 to facilitate non-slip adhesion of the outer gripping body 35 to the inner body 20. The outer gripping body 35 has end portions 36 and 37 which have a thickness such that they do not extend laterally outwardly substantially beyond the periphery of the end flanges 26 and 28. In the preferred embodiment the front end portion 37 is substantially flush with the outer surface of the front end flange 28, while the rear end portion 36 may extend laterally outwardly a slight distance beyond and slightly overlap the outer surface of the rear end flange 28, as can best be seen in FIGS. 1 and 4. It will be appreciated that the end flanges 26 and 28 cooperate with the outer gripping body 35 to inhibit longitudinal sliding movement of the outer gripping body 35 relative to the inner body 20.

Preferably, the thickness of the outer gripping body 35 is substantially constant along the length and around the periphery of the handle, but it may vary slightly. However, it will be appreciated that, by suitable design of the molding tools, the outer surface of the finished hand tool 10 may have any desired cross-sectional shape anywhere along its length.

There results a hand tool with a hard, rigid inner body 20 fixedly secured to the tool shank 12 so as to provide the necessary strength for high-torque applications, while at the same time providing a relatively soft and flexible outer gripping body 35 for contact with the user's hand to afford a comfortable frictional gripping surface.

In forming the tool 10, the inner body 20 is preferably injection molded around an end of the shank 12, and then the outer gripping body 35 is injection molded around the inner body 20. However, it will be appreciated that, if desired, the inner body 20 could be molded separately with an axial bore at one end and the shank 12 then press-fitted therein or secured by suitable adhesives or the like. Also, it will be appreciated that other techniques could be used for applying the outer gripping body 35 and, if desired, it could be secured in place by the use of suitable adhesives or the like.

From the foregoing, it can be seen that there has been provided an improved hand tool and method of forming same with a handle having both high strength and a comfortable gripping surface for contact with the user's hand.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A hand tool comprising:

a relatively hard and rigid inner body of unitary one-piece construction having an elongated central portion and two end flanges extending laterally outwardly of the central portion around the entire periphery thereof, said central portion having a peripheral annular groove formed therein adjacent to an end flange, and an outer gripping body formed of a relatively soft and flexible material surrounding said central portion of said inner body and terminating at said end flanges and filling said groove, each of said inner body and said outer gripping body having an outer surface which is non-circular in transverse cross section.

2. The tool of claim 1, wherein said inner body has a cross section which varies along its length.

3. The tool of claim 1, wherein said inner and outer bodies are respectively formed of plastic and elastomeric materials.

4. The tool of claim 3, wherein said inner body is formed of a polyproprylene material and said outer body is formed of a thermoplastic elastomer material.

5. The tool of claim 1, wherein the portions of said outer body respectively adjacent to said end flanges are laterally approximately coextensive with said end flanges.

6. The tool of claim 5, wherein at least the portion of said outer body adjacent to at least one of said end flanges is substantially flush therewith.

7. The tool of claim 1, and further comprising a shank embedded in said inner body and projecting from one end thereof substantially coaxially therewith.

* * * * *